United States Patent
Song et al.

(10) Patent No.: US 10,909,483 B2
(45) Date of Patent: Feb. 2, 2021

(54) RETAIL CUSTOMER MANAGEMENT SYSTEM

(71) Applicants: Yuh-shen Song, Northridge, CA (US);
Catherine Lew, Northridge, CA (US);
Alexander Song, Northridge, CA (US);
Victoria Song, Northridge, CA (US)

(72) Inventors: Yuh-shen Song, Northridge, CA (US);
Catherine Lew, Northridge, CA (US);
Alexander Song, Northridge, CA (US);
Victoria Song, Northridge, CA (US)

(*) Notice: Subject to any disclaimer, the term of this patent is extended or adjusted under 35 U.S.C. 154(b) by 528 days.

(21) Appl. No.: 14/189,871

(22) Filed: Feb. 25, 2014

(65) Prior Publication Data
US 2015/0242770 A1    Aug. 27, 2015

(51) Int. Cl.
*G06Q 10/06*    (2012.01)
*G06Q 30/02*    (2012.01)

(52) U.S. Cl.
CPC ..... *G06Q 10/0631* (2013.01); *G06Q 30/0281* (2013.01)

(58) Field of Classification Search
CPC .... G06Q 10/00; G06Q 30/02; G06Q 30/0201;
G06Q 30/0268; G06Q 30/0641; G06Q
20/3821; G06Q 20/40145; G06Q
20/3223; G06Q 20/10; G06Q 10/0631;
G06Q 10/02
USPC ................................. 705/7.11–7.42
See application file for complete search history.

(56) References Cited

U.S. PATENT DOCUMENTS

| 5,502,806 A | * | 3/1996 | Mahoney | G07C 11/00 |
| | | | | 235/382 |
| 6,026,375 A | * | 2/2000 | Hall | G06Q 10/08 |
| | | | | 701/533 |
| 8,224,700 B2 | | 7/2012 | Silver | |

(Continued)

FOREIGN PATENT DOCUMENTS

| JP | 2012-108649 | 6/2012 |
| KR | 10-1230127 | 2/2013 |

(Continued)

OTHER PUBLICATIONS

Labrou et al., Wireless Wallet, 2004, IEEE Computer Society, Proceedings of the First Annual International Conference on Mobile and Ubiquitous Systems: Networking and Service, pp. 1-10 (Year: 2004).*

(Continued)

*Primary Examiner* — Robert D Rines
(74) *Attorney, Agent, or Firm* — Seyfarth Shaw LLP

(57) ABSTRACT

A computer method enable retail businesses to manage their customers using personal communication devices. The method assigns a customer to a tail of a first wait list when the customer is at a location remote from the store and registers through a software application on a personal communication device. The method also sends a message to the personal communication device when a length of a second wait list is shorter than a predetermined length and the customer is at a head of the first wait list and ready to be moved to a transition pool. The method also moves the customer from the transition pool to the second wait list after the customer arrives at the store, and removes the customer from the second wait list in response to an action by the store.

17 Claims, 4 Drawing Sheets

(56) References Cited

U.S. PATENT DOCUMENTS

| | | | |
|---|---|---|---|
| 8,645,222 B1* | 2/2014 | Tamassia | G06Q 30/0635 705/26.1 |
| 9,055,400 B1* | 6/2015 | Lee | H04W 4/023 |
| 2003/0102956 A1* | 6/2003 | McManus | G07C 11/00 340/5.2 |
| 2005/0060173 A1* | 3/2005 | Hale | G06Q 10/02 705/5 |
| 2008/0133283 A1* | 6/2008 | Backer | G06Q 10/02 705/5 |
| 2011/0258058 A1* | 10/2011 | Carroll | G06Q 30/06 705/15 |
| 2013/0103486 A1* | 4/2013 | Hess | G06Q 30/02 705/14.38 |
| 2013/0282438 A1* | 10/2013 | Hunter | G01S 1/02 705/7.32 |
| 2014/0012757 A1* | 1/2014 | Henderson | G06Q 20/4014 705/44 |
| 2014/0172531 A1* | 6/2014 | Liberty | G06Q 20/3276 705/14.23 |
| 2014/0257877 A1* | 9/2014 | L'Heureux | G06Q 30/06 705/5 |
| 2015/0039450 A1* | 2/2015 | Hernblad | G06Q 20/322 705/15 |
| 2015/0058159 A1* | 2/2015 | Balram | G06F 21/32 705/26.7 |

FOREIGN PATENT DOCUMENTS

| | | |
|---|---|---|
| KR | 10-2013-0103861 | 9/2013 |
| KR | 10-2013-0120321 | 11/2013 |

OTHER PUBLICATIONS

International Search Report and Written Opinion—PCT/US2015/017502—ISA/KR—dated May 28, 2015.

First Technical Office Action—MX/a/2016/010985—IMPI (Instituto Mexicano de la Propriedad Industrial)—dated Feb. 14, 2019.

* cited by examiner

RETAIL CUSTOMER MANAGEMENT SYSTEM

TECHNICAL FIELD

The present disclosure relates generally to a customer management system. More specifically, one aspect of the present disclosure relates to managing customers for retail businesses based on personal communication devices of the customers.

BACKGROUND

Merchants like to encourage customers to repeatedly visit their businesses so that merchants can have more opportunities to increase business during these repeat visits. A variety of customer loyalty programs are used for this purpose. A large merchant, which has already automated its business operations with a computer system, can ask a customer to fill out an application form and issue a membership card (or an equivalent instrument) to the customer. The membership card bears identification information (e.g., an account number) to identify the customer. Based on the member identification information of the customer, the computer system tracks the activities of the customer and provides future discounts, rebates or other types of rewards to the customer. If the customer forgets to bring his/her membership card during a transaction, his/her home phone number can be used to identify the member account number so that purchase activity is recorded and rewards may be issued accordingly.

A problem with this approach is that many consumers do not like to release personal information to merchants for privacy concerns. Furthermore, some consumers who are moving at a fast pace do not want to spend time filling out application forms. Moreover, because many merchants are each offering their respective membership reward programs, consumers are tired of having to fill out applications over and over again. In addition, it is not convenient for consumers to carry many membership cards or instruments.

For a small merchant that has not automated its business with a computer system however, a paper coupon (or an equivalent instrument) can be issued to a customer to promote customer loyalty. The customer is responsible for carrying this coupon (or instrument) when conducting a transaction with the merchant. For example, the merchant can record the customer's activities on the coupon (or instrument) based on the dollar amount spent by the customer during each transaction. The customer can redeem the coupon (or instrument) for a reward after the accumulated dollar amount recorded on the coupon (or instrument) reaches a pre-defined level. Once the coupon (or instrument) is redeemed, a new coupon (or instrument) can be issued to the customer again.

A problem with this approach is that many small merchants do not have resources to print and manage these coupons (or instruments). Furthermore, many customers often lose these coupons (or instruments) and thus lose the monetary value they have accumulated on these coupons (or instruments). Very often, a customer may forget to bring the coupon (or instrument) during a transaction. Under such circumstances, customers may become disappointed or frustrated, and the original good intention to induce customer loyalty may have no effect or may result in a negative effect. Moreover, when many merchants offer customer loyalty programs through coupons, it becomes troublesome for customers to carry all of these coupons and such customer loyalty programs actually become a burden.

Many merchants have very light business activity during weekdays, but are extremely busy over the weekends or on holidays. For example, it is common to see a long line of customers waiting to dine at a popular restaurant over the weekend. Many customers may walk away from a restaurant because of the long line. Even in a supermarket, a customer may decide not to purchase anything when she sees a long line at the checkout stand. Merchants are losing potential business when they fail to shorten their lines.

Traditionally, promotions are conducted through mailing of paper-based promotional materials. This is an expensive process. It is often difficult for a merchant to justify the cost of the promotion. Very often, a merchant may end up losing money to go through a promotional campaign. The delay caused by this printing and mailing process may make a promotional campaign ineffective for perishable goods or services. For example, when a restaurant finds out that it has too many empty tables on a particular evening, it has little chance to distribute coupons in time to attract customers to the restaurant that evening. In fact, most promotional materials end up in the trash without being read, which is a waste of natural resources and damages our environment.

Merchants also suffer from fraud losses. Traditional payment instruments, such as credit cards, debit cards, ATM cards, stored-value cards, gift cards, prepaid cards, checks, coupons, tokens, tickets, vouchers, certificates, notes, securities, etc., can be easily stolen and fabricated. For example, by bribing a waiter in a restaurant, a fraudster can easily steal the card information from a guest of the restaurant. The fraudster can use the stolen card information to pay a nominal fee to numerous background search websites on the Internet to find useful personal information based on the cardholder's name shown on the stolen card. A counterfeit card and a counterfeit identification document, such as a driver's license, can be easily fabricated with present technology.

Once a fraudster has stolen or fabricated such card, the fraudster can quickly conduct many illegal financial transactions before the affected financial institutions, organizations or individuals identify the fraud and disable the card. Many individuals, merchants, and financial institutions have suffered tremendous material loss and damages as a result of fraudulent financial transactions.

In fact, theft of financial instruments is easily committed today. Many financial institutions and merchants keep the personal information (e.g., the information of the financial instruments such as credit cards, debit cards, etc.) of their clients in their databases. It is common for employees of financial institutions, merchants, or consumer credit report companies to steal customers' information, commit fraud, and/or sell the information to fraudsters.

SUMMARY OF THE DISCLOSURE

One aspect of the present disclosure enables consumers to conduct financial transactions in a secure manner without using traditional financial instruments that can be easily stolen or fabricated. This aspect of the present disclosure may eliminate the need for consumers to carry traditional financial instruments such as checks, credit cards, debit cards, stored-value cards, pre-paid cards, ATM cards, gift cards, coupons, tokens, tickets, vouchers, certificates, notes, securities, etc.

Furthermore, one aspect of the present disclosure helps merchants instantly and effectively promote their services and goods, including products, materials, tangible properties, intangible properties, or other things that can be traded. Moreover, another aspect of the present disclosure helps merchants manage their customer loyalty programs. In addition, one aspect of the present disclosure helps merchants manage their customer waiting lines and alleviates unnecessary frustration to customers.

In one aspect of the present disclosure, a computer system assigns a customer to the end (i.e., tail) of a first wait list of a store when the customer is not at the store (i.e., remotely located) and registers through a software application on a personal communication device of the customer. The computer system may also send a message to the personal communication device of the customer when a length of a second wait list of the store is shorter than a predetermined length and the customer is at the head of the first wait list and is ready to be moved to a transition pool of the store. The computer system moves the customer from the transition pool to the second wait list of the store after the customer arrives at the store. The computer system also removes the customer from the second wait list of the store in response to an action by the store.

In another aspect of the present disclosure, a software application on a personal communication device enables the customer to remotely register with a first wait list of the store. The software application also notifies the customer, through the customer's personal communication device, to check in with the store when a length of a second wait list of the store is shorter than a predefined length and the customer is at the head of the first wait list and thus ready to be moved to a transition pool of the store. The software application further enables the customer to authorize a payment to the store after the customer is moved from the transition pool to the second wait list of the store.

In a further aspect of the present disclosure, a computerized method includes sending, by a computer system, a message to a personal communication device of a customer to promote an item for a store. The computerized method also includes assigning, by the computer system, the customer to a tail of a first wait list of the store when the customer is at a location remote from the store and registers through a software application on a personal communication device of the customer. The computerized method further includes sending, by the computer system, a message to the personal communication device of the customer when a length of a second wait list of the store is shorter than a predefined length and the customer is at the head of the first wait list of the store and thus ready to be moved to a transition pool of the store. The computerized method also includes moving the customer from the transition pool of the store to the second wait list of the store after the customer arrives at the store.

The computerized method further includes transferring an amount of money from an account of the customer after the customer is moved to the second wait list of the store. The computerized method also includes transferring, by the computer system, to an account of the store the amount of money minus a service fee associated with the promoted item.

In another aspect of the present disclosure, a software application on a computer system assigns a customer to a tail of a first wait list of a store when the customer is at a location remote from the store and registers through a software application on a personal communication device of the customer. The software application on the computer system also sends a message to the personal communication device of the customer when a length of a second wait list of the store is shorter than a predefined length and the customer is at the head of the first wait list and thus ready to be moved to a transition pool of the store. The software application on the computer system further moves the customer from the transition pool to the second wait list of the store after the customer arrives at the store. The software application on the computer system removes the customer from the second wait list of the store in response to an action by the store.

In this disclosure, the terminology "network" or "networks" generally refers to a communication network or networks, which can be wireless or wired, private or public, real time or non-real time, or a combination of them, and includes the well-known Internet.

In this disclosure, the terminology "computer" or "computer system" generally refers to either one computer or a group of computers, which may work alone or work together to reach the purposes of the system.

In this disclosure, the terminology "processor" generally refers to either one processor or a group of processors, which may work alone or work together to accomplish the purposes of the computer system.

In this document the term "module" refers to a single component or multiple components which can be hardware, software, firmware, or a combination thereof, and may work alone or work together to accomplish the purposes of the module.

In this document the term "device" refers to a single component or multiple components which can be hardware, software, firmware, or a combination thereof, and may work alone or work together to accomplish the purposes of the device.

In this disclosure, "retail businesses" generally refer restaurants, fast food stores, food stands, food trucks, bookstores, clothing stores, grocery stores, drug stores, gift stores, shoe stores, bag stores, clothing stores, furniture stores, convenience stores, electronic stores, appliance stores, equipment stores, tool stores, department stores, gardening stores, building material stores, supermarkets, bus stops, bus stations, train stops, train stations, taxi stands, car shops, boat shops, vehicle shops, hotels, apartments, financial institutions, money services providers, schools, theaters, parks, fair grounds, entertainment centers, hospitals, medical centers, dentist offices, doctor offices, beauty salons, barbershops, goods providers, service providers, organizations, clubs, associations, companies, offices, businesses, kiosks, machines, or any types of facilities which interface with customers.

In this disclosure, a "bank" or "financial institution" generally refers to a financial service provider, either a bank or a non-bank, where financial services are provided.

In this disclosure, a "bank account" or "financial account" generally refers to an account associated with a financial institution, either a bank or a non-bank, where financial transactions can be conducted through financial instruments such as cash, checks, credit cards, debit cards, ATM cards, stored value cards, gift cards, pre-paid cards, wires, monetary instruments, letters of credit, notes, securities, commercial papers, commodities, precious metal, electronic fund transfers, automatic clearing house, etc.

In this disclosure, "financial transactions" generally refer to transactions related to financial activities, including but not limited to payment, fund transfer, money services, payroll, invoicing, trading, escrow, insurance, underwriting, merger, acquisition, account opening, account closing, etc.

In this disclosure, "trading" generally refers to trading activities, both private and public, including but not limited to trading of stock, currency, commodities, rights, values, securities, derivatives, goods, services, merchandise, etc.

In this disclosure, "securities" are generally referred to according to the definition in the Securities Act of 1933. For example, securities may generally include note, stock certificate, bond, debenture, check, draft, warrant, traveler's check, letter of credit, warehouse receipt, negotiable bill of lading, evidence of indebtedness, certificate of interest or participation in any profit-sharing agreement, collateral-trust certificate, preorganization certificate or subscription, transferable share, investment contract, voting-trust certificate; valid or blank motor vehicle title; certificate of interest in property, tangible or intangible; instrument or document or writing evidencing ownership of goods, wares, and merchandise, or transferring or assigning any right, title, or interest in or to goods, wares, and merchandise; or, in general, any instrument commonly known as a "security", or any certificate of interest or participation in, temporary or interim certificate for, receipt for, warrant, or right to subscribe to or purchase any of the foregoing.

In this disclosure, a "consumer" generally refers to a customer, person, subject, subject person, payer, user, or client, etc., seeking to perform a transaction with an individual, an organization, a merchant, and/or a financial institution.

In this document, the terminology "official identification document" generally refers to a passport, driver's license, voter card, benefits card, student identification card, social security card, national identification card, identity card, certificate of legal status, and other official documents and information bearing instruments that identify a designated individual by certain verifiable characteristics, that are issued or certified by a consulate, embassy, government agency, or other governmental authorities, and that are protected against unauthorized copying or alteration by the responsible government. In particular, such "official identification documents" can be formed from various materials, including paper, plastic, polycarbonate, PVC, ABS, PET, Teslin, composites, etc. and can embed the identification information in various formats, including printed or embossed on the document (or card), written on a magnetic medium, programmed into an electronic device, stored in a memory, and combinations thereof. The "identification information" may include, but is not necessarily limited to, names, identification numbers, date of birth, signatures, addresses, passwords, phone numbers, email addresses, personal identification numbers, tax identification numbers, national identification numbers, countries that issue the IDs, states that issue the IDs, ID expiration date, photographs, fingerprints, iris scans, physical descriptions, and other biometric information. The embedded information can be read through optical, acoustic, electronic, magnetic, electromagnetic and other media.

In this disclosure, "personal identification information" generally refers to name, address, date of birth, personal identification number, user ID, password, tax identification number, type of the identification document used, identity number associated with the identification document, country, state, government organization and/or a private organization issuing the identification document, expiration date of the identification document, phone number, screen name, e-mail address, photographs, fingerprints, iris scans, physical descriptions, and other biometrical information.

In this disclosure, "personal information" includes at least personal identification information, personal relationships, personal status, personal background, personal interests, and personal financial information including information related to financial instruments, financial accounts and financial activities.

In this disclosure, "financial instruments" generally refer to instruments which are used to conduct financial transactions. Examples of financial instruments include cash, credit cards, debit cards, ATM cards, prepaid cards, stored value cards, gift cards, checks, monetary instruments, wire transfers, letters of credit, notes, securities, commercial papers, commodities, gold, silver, etc.

In this disclosure, a "personal communication device" generally refers to a device interface used for personal communication purposes.

In this disclosure, a "personal communication address" generally refers to an identifier which is used to identify a person or an entity during private communications. For example, a mobile phone number is a personal communication address. An email address is a personal communication address.

In this disclosure, "device interface" generally refers to keyboard, keypad, monitor, display, terminal, computer, mobile phone, smartphone, Smartbook, iPad, Mac Book, Chromebook, Windows tablet, Personal Digital Assistant (PDA), smart watch, smart wearable devices, control panel, vehicle dash board, network interface, machinery interface, video interface, audio interface, electrical interface, electronic interface, magnetic interface, electromagnetic interface including electromagnetic wave interface, optical interface, light interface, acoustic interface, video interface, audio interface, contactless interface, handheld device interface, portable device interface, wireless interface, wired interface, or other type of interface.

In this document, the terminology "terminal" or "kiosk" generally refers to equipment, including a computer and/or its peripherals, microprocessor and/or its peripherals, ATM terminal, check-cashing kiosk, money services kiosk, merchant checkout stand, cash register, coin exchange machine, parking lot payment kiosk, other payment kiosks, contactless device, wire line phone, mobile phone, smartphone, Smartbook, personal communication device, PDA, digital assistant, entertainment device, network interface device, router, and/or Personal Digital Assistant (PDA), etc., which interfaces a user with a computer network, so that the user may interact with computer systems and other equipment connected to the computer network.

For a further understanding of the nature and advantages of the disclosure, reference should be made to the following description taken in conjunction with the accompanying drawings.

DETAILED DESCRIPTION

Figure 1:
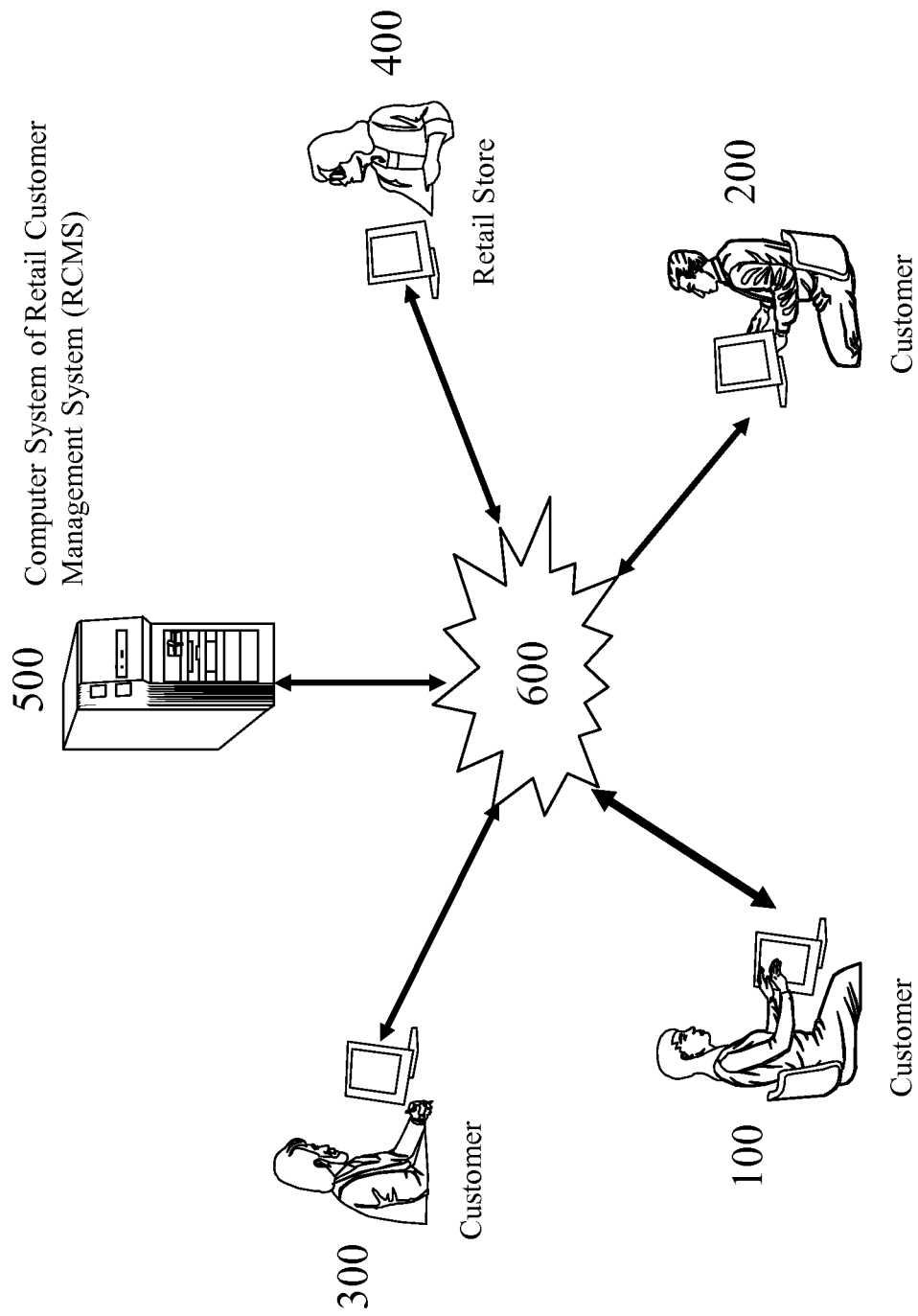
FIG. 1 illustrates a system and network diagram of a Retail Customer Management System ("RCMS") to enable merchants to manage customers.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent, however, to those skilled in the art that these concepts may be practiced without these specific details. In some instances, well-known structures and components are shown in block diagram form to avoid obscuring such concepts. As described herein, the use of the term "and/or" is intended to represent an "inclusive OR", and the use of the term "or" is intended to represent an "exclusive OR".

Customer Management is an ongoing challenge for retail businesses. Traditionally, some large merchants issue membership cards to consumers after they fill out an application form. Some types of discounts or reward programs are tied with these membership cards as an incentive for consumers to join. However, when more and more cards are issued to consumers from different merchants, it becomes inconvenient for consumers to carry multiple membership cards. Some merchants begin to use a personal phone number to track customer membership. As long as a phone number given by a customer matches a phone number in the database of the merchant, the membership discount can be applied based on that phone number even if the customer does not truly own that phone number. Sometimes, a friend of a customer may use the customer's phone number to obtain a discount. As a result, tracking a customer's membership based on a phone number to apply a discount has practically become a formality. Such approach provides limited value in terms of customer management.

Customer management in retail business is expected to achieve several basic functions including, for example, promotions, payments, satisfaction and loyalty management, inventory management, delivery management, etc. The ultimate goal is to facilitate a customer to spend as much money with the merchant as possible for the rest of his life. Some aspects of the present disclosure intend to achieve this goal.

For easy explanation, a restaurant is used as an example in the present disclosure. However, the present disclosure can also be applied to other retail businesses such as fast food stores, food stands, food trucks, bookstores, clothing stores, grocery stores, drug stores, gift stores, shoe stores, bag stores, clothing stores, furniture stores, convenience stores, electronic stores, appliance stores, equipment stores, tool stores, department stores, gardening stores, building material stores, supermarkets, bus stops, bus stations, train stops, train stations, taxi stands, car shops, boat shops, vehicle shops, hotels, apartments, financial institutions, money services providers, schools, theaters, parks, fair grounds, entertainment centers, hospitals, medical centers, dentist offices, doctor offices, beauty salons, barbershops, goods providers, service providers, organizations, clubs, associations, companies, offices, businesses, kiosks, machines, or any types of facilities which interface with customers. In fact, the present disclosure can be applied to any business or non-business situation even when consumers are not involved.

For a typical restaurant, a capacity of a room corresponds to a maximum number of guests seated at any one time. Most restaurants have instances when they are below capacity during normal weekdays, but are very crowded over the weekends and on holidays. It is desirable for restaurants to conduct some special promotions during the less crowded times (e.g., weekdays) to utilize their excess capacity. It is also desirable for the restaurant to effectively manage its waiting line over the weekends and on holidays to increase or even maximize their customer flow. Some aspects of the present disclosure provide solutions to conducting promotions for retail businesses, including restaurants. Some aspects of the present disclosure provide solutions to managing the waiting line for retail businesses.

The space in a restaurant is conceptually perishable. If a space is not utilized during lunch or dinner time, the value of that space is lost during that particular lunch or dinner time and can never be obtained later. For example, if a customer who reserved a table does not show up while other guests cannot be seated at that reserved table, the restaurant may lose money that could have been earned by a paying customer at that table. Even if the customer shows up at a later time, the restaurant still has lost money during the idle period when that reserved table was empty.

Therefore, many restaurants do not accept reservations. They insist that a customer appear at the restaurant in person to sign in with the host of the restaurant and provide the number of people in the customer's party (i.e., the total number of people who will dine together in that group) so that the party can be put into a waiting list. The restaurant will call the parties on the waiting list one by one. Because there are many parties on the waiting list, all tables will be fully utilized during the busy lunch or dinner time with this approach. As a result of this practice, during weekends or holidays, a party may need to wait for over one hour in order to be seated in a popular restaurant.

Some people cannot wait for such a long time because of other scheduled activities and some people do not want to wait for too long because of personal preference. In addition, waiting can be very difficult for parties with young kids who can become restless during the long waiting time. Therefore, some people will not be willing to wait when there is a long waiting list and will go to a different restaurant. Almost every consumer has had some past experience of giving up the original choice of restaurant because of a long waiting list. Most consumers will not wait for over 45 minutes. Some consumers will not even wait for 15 minutes. Therefore, many restaurants are losing potential business because customers do not want to wait. In fact, such waiting can be very frustrating and often causes customer complaints. A restaurant may lose future business because those frustrated customers may never come back to the same restaurant again or complain to other potential customers about how long the wait was such that the other potential customers are deterred from going to the restaurant.

One aspect of the present disclosure helps retail businesses manage their waiting lists. In this restaurant example, the length of a waiting list is determined by the restaurant capacity to accommodate customers and the number of customers that may show up at the same time. Because the restaurant room capacity is fixed, the factor that can be managed is the number of customers who will show up at the same time. Generally speaking, waiting in the lobby of a restaurant is a frustrating experience, but waiting at home or other places may not be inconvenient at all. For example, it can be much easier for a party with kids to let the kids watch TV at home, then show up at the restaurant when it is the time for the party to be seated. The ideal solution is to make a reservation; however, as explained earlier, many restaurants do not accept reservations.

In one aspect of the present disclosure, a customer who is away from a restaurant can remotely register with the restaurant through a software application on his personal communication device. The name and phone number of the customer and the number of persons in his party are recorded by the computer system. At first glance, a restaurant may not like this approach because such remote registration sounds like a reservation, which can cause some reserved tables to become idle if the customer and his party do not show up on time.

In one aspect of the present disclosure, this remote registration from a software application on a personal communication device is not handled as a reservation of a table or a time slot. Instead, a registered party is added to the last position (i.e., tail) of a first wait list. This process of registration with a restaurant's first wait list can be handled by a computer system without any human intervention. This automation is very important because a busy restaurant will not want to allocate additional resources to manage this first wait list. Furthermore, when any party walks into the restaurant, the party is also added to the first wait list by the restaurant. This first wait list establishes the first-level priority sequence of each party in waiting. In one aspect of the present disclosure, a first wait list is a set of customers stored in a database. In another aspect of the present disclosure, a first wait list is a set of customers displayed on a device interface. In yet another aspect of the present disclosure, a first wait list is a set of customers stored in a temporary storage component or device. In an alternative aspect of the present disclosure, a first wait list is a set of customers processed by a computer system.

In one aspect of the present disclosure, the computer system records the time when each party is added to the first wait list. Because the computer also records the time when a party is seated in the restaurant, the computer system can easily find out how long the last party had been waiting before being seated in the restaurant. This information regarding the waiting time of the last seated party can be used as an estimate of the current waiting time. Therefore, in one aspect of the present disclosure, once a party is added to the first wait list, the computer system sends a message to a personal communication device of the customer who made the registration to confirm the registration and to provide an approximate waiting time. As a result, the waiting party can schedule its activities according to this information of the approximate waiting time. In fact, even before the customer registers remotely, the computer system can provide an approximate waiting time so that the customer can decide whether to proceed to remotely register with the restaurant.

In one aspect of the present disclosure, for the walk-in party, a restaurant can register the walk-in party with the computer system by using a device interface of the computer system, such as a tablet device. The name and phone number of a customer of the walk-in party are recorded in the computer system. The number of persons of the walk-in party is also recorded in the computer system. The computer system informs the walk-in customer, whose phone number has been added to the first wait list, of the approximate waiting time and invites him to download the software application to his personal communication device so that he can register remotely from the software application on his personal communication device in the future.

As a result of using the software application, for his next visit to the restaurant, he does not need to show up in person to register himself in the waiting list. Because a customer may have nothing important to do when he is waiting in the lobby of the restaurant, he may just go ahead and download the software application while he is waiting in the lobby. This approach will naturally promote the software applications to customers who walk into the restaurant. For easy reference in the present disclosure, a software application on a personal communication device is referred to as a "mobile app."

In one aspect of the present disclosure, to avoid abusive use of the remote registration through the mobile app, a party pays a small fee for the remote registration. If a party does not show up at the restaurant after the remote registration, this small fee will be forfeited as a cancellation fee.

In one aspect of the present disclosure, the fee amount is charged based on the number of persons in the party. For example, five dollars can be charged for each person in the party with a minimum charge of ten dollars per party. As a result of this fee, a restaurant may feel more comfortable to accept such remote registration through the mobile app because, if the registered party does not show up, the restaurant can earn some additional income.

In one aspect of the present disclosure, while a party is waiting after completing remote registration through the mobile app, the computer system sends promotional materials to the party through the mobile app. The promotional materials may include a food menu, today's special, chef recommendations, special deals, etc.

Parties on the first wait list do not need to show up at the restaurant until they are informed by the computer system to do so. Therefore, parties on the first wait list can continue their existing activities without the need to wait in the restaurant. The use of the first wait list effectively avoids the frustration that customers may have when they wait in the lobby of the restaurant. The information in the first wait list also provides the restaurant with an indicator of potential business on that day so that the restaurant can plan in advance. For example, if the food ordering history of a customer has been recorded by the computer system, the restaurant can forecast the inventory usage by the customer based on his ordering history.

In general, a party does not mind waiting in the lobby of a restaurant if only a few parties are ahead of them. For a restaurant with a large capacity, it may be fine to keep, for example, eight parties waiting in the lobby. For a small restaurant with a small capacity, it may be desirable to keep only four parties waiting in the lobby. The target number of parties that may wait in the lobby can be determined by the restaurant and the goal is to keep the waiting time of each party as short as possible.

For easy management by the computer system, the parties waiting in the lobby of the restaurant are listed on a second wait list. The restaurant can call the parties in the lobby one by one to seat them in the restaurant based on their priority sequence on the second wait list. If a walk-in customer is still on the first wait list, he will not be called by the host even though he is waiting in the lobby.

Once a party is seated by the restaurant, the host removes that party from the second wait list by using the device interface of the computer system. If the length of the second wait list is less than a predefined number, e.g., three, which is determined by the restaurant, the computer system sends a message to request the party at the first position (i.e., head) of the first wait list to check in with the restaurant. Furthermore, the computer system also removes the party from the first wait list. For the purpose of this disclosure, this predefined number is referred to as "Reference Length."

Because a customer who remotely registered with the first wait list may not be able to arrive at the restaurant immediately after the computer system sent him a message requesting check in, this customer is not added to the second wait list yet. Instead, he is assigned to a transition pool, which accommodates all parties that have been removed from the first wait list but have not yet checked in with the restaurant. If a party is at the head of the first wait list and the second list is shorter than a predetermined length, the party is ready to be moved to the transition pool. In one aspect of the present disclosure, a transition pool is a set of customers marked in a database. In another aspect of the present disclosure, a transition pool is a set of customers marked on a device interface. In yet another aspect of the present disclosure, a transition pool is a set of customers stored in a temporary storage component or device. In an alternative aspect of the present disclosure, a transition pool is a set of customers processed by a computer system.

In one aspect of the present disclosure, a party in the transition pool is added to the second wait list after the party arrives at the restaurant and checks in with the host of the restaurant. If a party is on the second wait list, the party is already in the lobby and ready to be seated by the restaurant. After a party is seated by the host, the host removes that party from the second wait list. The computer system will then request the next party at the first position (i.e., head) of the first wait list to check in with the restaurant when the length of the second wait list is shorter than a predefined length, which is determined by the restaurant. In one aspect of the present disclosure, a second wait list is a set of customers marked in a database. In another aspect of the present disclosure, a second wait list is a set of customers marked on a device interface. In yet another aspect of the present disclosure, a second wait list is a set of customers stored in a temporary storage component or device. In an alternative aspect of the present disclosure, a second wait list is a set of customers processed by a computer system.

The transition pool is used to smooth out the irregularities between the first wait list and the second wait list. Things do not always work out as planned. For example, a party may be delayed because a customer needs a longer time to dress up, a customer wants to finish watching a sports game on TV, a traffic jam occurs on the road, etc. As a result of these unexpected delays, Party A which was ahead of Party B on the first wait list may actually check in with the restaurant much later than Party B. It is unfair for Party B to wait simply because Party A has not shown up. Therefore, the sequence on the second wait list is based on which party checks in at the restaurant first after the parties have been informed to check in. Because the priority sequence in the first wait list may be different from the priority sequence in the second wait list, the transition pool is used as a buffer to reorganize the priority sequence in the second wait list.

Theoretically, if every party checks in with the restaurant immediately after receiving a check-in message from the computer system, the priority sequence in the first wait list should be identical to the priority sequence in the second wait list. Therefore, if a party is late, it is understandable to the party that its priority on the second wait list is different from its priority on the first wait list. In practice, because the computer system handles the remote registration, the first wait list, the second wait list and the transition pool, a customer does not really know that his priority has been modified because of being late. As long as his party can be seated promptly, a customer may not even notice any difference.

In one aspect of the present disclosure, the computer system sends a check-in message again to a party in the transition pool if the party has not checked in with the restaurant within a predefined period of time (e.g., 20 minutes) after the last check-in message was sent. These repeated messages can avoid a complaint by a customer later that he never received a message for check-in with the restaurant.

In one aspect of the present disclosure, the computer system sends driving directions to a personal communication device of a customer, who is in the transition pool, to help him find the restaurant.

In one aspect of the present disclosure, the computer system sends some promotional information to a personal communication device of a customer, who is in the transition pool, to encourage him to visit the restaurant.

In one aspect of the present disclosure, the computer system conducts a financial transaction with a customer, who is in the transition pool. Advertising materials for third parties can also be sent to the customer in the transition pool to earn additional income for the RCMS.

After the closing of the business day, the entities left in the transition pool are parties that have remotely registered but have never checked in with the restaurant. In one aspect of the present disclosure, a cancellation fee is charged to each customer left in the transition pool after the closing of the business day.

In practice, the priority sequence on the second wait list may not be strictly enforced. For example, if customer A went to the bathroom after checking in with the restaurant, it is fine to seat the next party first because nobody knows when customer A will return from the bathroom. Customer A will be seated at the next available table after returning from the bathroom. Because only a few parties may wait in the lobby of the restaurant at any given time, it is a simple task for the host of restaurant to manage these minor irregularities on the second wait list.

In one aspect of the present disclosure, the restaurant can manually request the computer system to inform the next party on the first wait list that it is time to check in. This option may be useful for an unusual situation in which, for example, all parties that have checked in with the restaurant are not present, or all parties that have been requested to check in have not arrived yet when a table has become available.

The entire process described above can be handled by a computer system. The restaurant only uses a device interface of the computer system, such as a tablet computer, to manage the second wait list, which only consists of a few parties waiting in the lobby of the restaurant at any given time. As a result of using the methods described in the present disclosure, no party waits for a long period in the lobby of the restaurant. Nobody will walk away from the restaurant because of the long waiting time. The host has a simplified job. Customers are much happier and the restaurant will naturally do more business.

Because a personal communication device is used by a customer, many other services can be provided through the mobile app. In one aspect of the present disclosure, the computer system sends a message to invite the customer to join a Customer Loyalty Program of the restaurant. After the customer joins the Customer Loyalty Program, the computer system can send promotions of the restaurant to the customer from time to time. For customer privacy, it is desirable that the computer system does not push any promotion of a restaurant to a personal communication device of a customer until after the customer has agreed to join a Customer Loyalty Program of the restaurant.

In one aspect of the present disclosure, the Customer Loyalty Program offers some special discounts. In another aspect of the present disclosure, the Customer Loyalty Program offers some special gifts. In yet another aspect of the present disclosure, the Customer Loyalty Program offers some free items. In an alternative aspect of the present disclosure, the Customer Loyalty Program offers some rebates. There is no limitation on what a Customer Loyalty Program can offer. The ultimate goal is to earn customer loyalty and attract customers to frequently visit the restaurant.

In one aspect of the present disclosure, these discounts, gifts, rebates, etc. are awarded based on the need of the restaurant. For example, many restaurants have very light activities during some weekday evenings. It is desirable for a restaurant to conduct some special promotions to members of its Customer Loyalty Program during these evenings.

In one aspect of the present disclosure, these discounts, gifts, rebates, etc. are awarded based on an accumulated amount of money spent by the customer with the restaurant. This approach can earn long-term support by the customer. Similarly, in another aspect of the present disclosure, these discounts, gifts, rebates, etc. are awarded based on the frequency of visits by the customer to the restaurant. Many other types of incentives can be offered through the Customer Loyalty Program.

In one aspect of the present disclosure, the computer system can be owned and operated by a business that does not own any restaurant or retail store. For easy reference, this business is referred to as the Retail Customer Management System (RCMS). In one aspect of the present disclosure, the RCMS signs on consumers as members of the RCMS club.

There are many different ways to sign on new members. In one aspect of the present disclosure, a new member only provides a full name, credit card (or other type of payment card) information and a billing address. As a result, the RCMS activities can be conducted based on the credit card or other type of card.

Sometimes, a more strict set of rules may be applied because of regulatory requirements. For example, in one aspect of the present disclosure, a consumer logs into the RCMS computer through a device interface to open an account with the computer system of the RCMS and provides the RCMS with the consumer's personal information, including personal identification information.

In another aspect of the present disclosure, the embedded information of an official identification document is read by a device interface to provide the personal identification information. Because the official identification document is protected by the respective government, reading the embedded information directly from the official identification document can effectively prevent fraud.

To make sure that the consumer is the true owner of the official identification document, the embedded information of the official identification document can be used to authenticate the identity of the consumer. For example, if the biometric information of the person, such as fingerprint, iris patterns, photo, etc., corresponds to the biometric information embedded within or on the official identification document, the person is the true owner of the official identification document.

Alternatively, if a person can accurately provide some private information, such as personal identification number, which is embedded inside the official identification document, this person is very likely the true owner of the official identification. This authentication approach is much more accurate than the traditional approach, which depends on human comparison between the appearance of the person and the photo on the official identification document. Furthermore, because this authentication approach eliminates the need for human involvement, a consumer can open an account at a terminal, kiosk, etc.

The RCMS computer system processes the personal information submitted by the consumer and approves the account opening for the consumer in compliance with regulations and laws. Once an account is opened, a consumer can be identified by a set of partial personal identification information.

For example, a consumer can be identified by a combination of the zip code of the address shown on the consumer's identification document, the year of birth, the last four digits of the ID number, the first two letters of the first name, the first two letters of the last name shown on the ID, the country/state of issuance of the ID, the expiration date of the ID, etc. Because only a set of partial data of the consumer's personal identification information is used, the true identity of the consumer is not disclosed. Furthermore, there is no way to recover the personal identification information of the consumer from or through this set of partial data.

Although only a set of partial data of the consumer's personal identification information is used, the probability of a mismatch when two persons having the same set of partial data can be substantially reduced to zero if a sufficient amount of partial data is used. In the current example, the probability for a mismatch is in the magnitude of about 1 out of $10^{22}$. The number $10^{22}$ is derived from the approximation of $10^5$ (5 digit zip code)$\times 10^2$ (year of birth based on two digits of a 100-year life span)$\times 10^4$ (4 digits of ID number)$\times 26^2$ (2 letters of first name)$\times 26^2$ (2 letters of last name)$\times 200$ (estimated number of participating countries)$\times 365 \times 4$ (a 4-year effective period for the ID).

Even if two consumers have the same set of partial data, such confusion can be easily resolved by other methods. For example, the computer system of RCMS can assign an additional number with a very short length, such as six digits, to distinguish among the persons who happen to have the same set of partial personal identification information.

Because there are only about 6 billion persons on earth (i.e., 6×109), the total number of persons who may have the same set of partial personal identification data is a very small number if a sufficient amount of partial personal identification data is used. As a result, a number of a few digits will be more than sufficient to identify the entire population on earth when a set of partial personal identification data is also used for identification purposes. In fact, it is possible that even 2 or 3 digits will be sufficient.

Because only a few digits are assigned by the computer system of the RCMS, a consumer only needs to remember this short number of a few digits because the consumer should know his/her own personal identification information.

For the purpose of this disclosure, this short number is referred to as Account Identification Number (AIN). As a result, the equivalent account identification (which is equivalent to the traditional account number) of the RCMS can be a combination of the AIN and a set of personal identification data. For example, a possible account identification of the RCMS can be composed of the 5-digit zip code of the consumer, the last 4 digits of the consumer's phone number, and a 6-digit AIN. In general, a consumer remembers his/her zip code and phone number. As a result, a consumer only needs to remember his/her short AIN.

In one aspect of the present disclosure, the AIN is assigned by the RCMS computer system. To further reduce the need for consumers to memorize numbers, in another aspect of the present disclosure, a consumer can suggest his/her own preferred AIN and the RCMS computer system can approve the particular AIN if no other person in the RCMS database, whose set of partial personal identification data is identical to the consumer's, has used the suggested AIN yet.

If zip code is not used in a particular country or area, a possible account number of the RCMS can be composed of, for example, the last 5 digits of the official identification document number of the consumer, the last 4 digits of the consumer's primary phone number, and a 6-digit AIN assigned by the RCMS computer. In fact, many other different sets of partial personal identification information can be used to achieve the same goal.

Because only partial personal identification information is used, the identity of the consumer cannot be recovered from a set of partial personal identification information and the privacy of the consumer is fully protected.

In one aspect of the present disclosure, if privacy is not a concern, the personal phone number of a person and the country code and the area code of the person can uniquely identify a person. Similarly, in another aspect of the present disclosure, email address, tax ID, account number of a financial instrument (e.g., credit card), etc. can also be used to uniquely identify a person. In an alternative aspect of the present disclosure, because personal communication devices have become very popular today, a personal communication device of a person can also uniquely identify the person.

In the event that a consumer cannot remember this short AIN of a few digits, in one aspect of the present disclosure, a consumer can use his/her identification document to conduct financial transactions. The information on the identification document can be entered by the consumer, the merchant, or the financial institution. It is preferable to use the "official" identification documents for this purpose because official identification documents are protected by the respective government organizations which issued the official identification documents.

In another aspect of the present invention, a device interface, such as a terminal, can read the information embedded within or on the identification document. As a result, a consumer can pay goods or services with his/her identification document at an automatic checkout stand. Alternatively, a consumer can be prompted by a device interface to enter his partial identification information such as zip code, phone number, etc.

In one aspect of the present disclosure, there is no need to send all the information of the identification document to the RCMS computer system. To protect the consumer's personal identification information which can be stolen during the data transmission, a set of partial data of the personal identification information can be used for identification purposes. For example, the 5-digit zip code, the last 6 digits of the identification document number and the initial of the last name can be used for identification purposes. In this example, the chance for a mismatch is one out of 2.6 trillion (i.e., $26 \times 10^5 \times 10^6$).

In another aspect of the present disclosure, a Personal Identification Number (PIN) can be used with dual purposes (1) to eliminate the chance of mismatch and (2) to enhance the security.

If privacy is not a concern, in one aspect of the present disclosure, the entire identification document number can be used for account identification purposes to reduce the probability of mismatches. Because there are many different countries, states and governments that may issue identification documents, such as driver licenses, passports, etc., an identification document number may not be unique. Under such circumstances, a PIN and/or AIN can eliminate such confusion. In another aspect of the present disclosure, the identification document number, the zip code and the PIN and/or AIN can be jointly used to reach the account identification goal.

The above identification document approach can also be used by an automatic checkout stand, an ATM terminal, a kiosk, or other types of device interfaces.

In one aspect of the present disclosure, the consumer uploads his/her recent photo into the computer system of the RCMS. Because a person's face is exposed to the public every day and many online social networks may have already posted the photo of the person on the Internet, the photo of a consumer is generally not considered to be "private information." This photo can be used to enhance the security of the RCMS operations.

In one aspect of the present disclosure, in order to open an account, a consumer may upload his/her name and tax ID so that the RCMS can verify the existence of the consumer through government records. Because each consumer has one unique tax ID in a country, each consumer has only one chance to open an account with the computer system of the RCMS. If a duplicate tax ID is detected, the RCMS can conduct an investigation to identify which consumer has the correct tax ID and can filter out the fraudster. The tax ID can be encrypted in the database, or encrypted in a separate database, so that nobody can see or use it after the account opening process.

For anti-money laundering and anti-terrorist financing purposes, in one aspect of the present disclosure, the computer system may screen users against the regulatory lists to ensure that the RCMS can conduct transactions with the users without worrying about money laundering or terrorist financing issues. In another aspect of the present disclosure, the computer system of RCMS can conduct transactional monitoring to detect suspicious activities in order to avoid money laundering or terrorist financing issues.

In yet another aspect of the present disclosure, a user may provide information about a financial account under the user's name. The RCMS can conduct a transaction with the user's financial account and request the user to report the amount and/or the type of transaction. If the user cannot report it correctly, the user may be a fraudster because he/she cannot tell what is going on in his/her own financial account. The financial account information can be encrypted so that nobody can see or use it.

To ensure that the personal identification information stored in the RCMS database is up-to-date, in one aspect of the present disclosure, a user may update his/her personal identification information in the RCMS database whenever there is a change of the information. For example, when a user moves to another state, his/her driver's license and address may be changed and the user may update the personal identification information stored inside the RCMS database.

In one aspect of the present disclosure, the RCMS computer system can detect a possible address change if the locations of a user's transactions have substantially changed to a new area. Upon such detection of a possible address change, the RCMS computer system can send a message to the user and request the user to update his/her personal identification information.

In one aspect of the present disclosure, a user may provide one or more contact phone numbers and/or email addresses for contact purposes.

In one aspect of the present disclosure, a user may input into the RCMS database a list of questions and answers which are designed by the user and relate to unique knowledge known only to the user. For example, a question may be "What is the name of a person who sat next to me during 1st grade?" The answer to this question will be similarly unique. Because the questions are designed by the user, the chance for a fraudster to know the answers is substantially negligible. For the purposes of this disclosure, these questions are referred to as "challenge questions."

In another aspect of the present disclosure, the challenge question may be "What is the key code?", and a user is required to input a key code into the device interface of the RCMS computer. For the purposes of this disclosure, a key code is an alpha-numeric combination designed by the consumer, substantially like a password. The chance for another person to know or correctly guess the key code is low.

To provide additional protection to the user, in one aspect of the present disclosure, a user can select his/her own user ID, Personal Identification Number, AIN, password, etc. In another aspect of the present disclosure, a user can change his/her user ID, Personal Identification Number, AIN, password, etc. from time to time as an extra protection against theft of these data used by the RCMS.

Because each user of the RCMS registers with the computer system of RCMS and uses the RCMS services based on a unique identity, the RCMS can conduct financial transactions for the user. There are many ways to transfer funds electronically between an entity's (e.g., payer's) account in a financial institution and the entity's account in the RCMS computer system. For example, in one aspect of the present disclosure, an Automatic Clearing House ("ACH") transaction can complete such an electronic fund transfer at a very low cost today.

In other aspects of the present disclosure, debit card networks, credit card networks, ATM or other real time and non-real time networks can be used to transfer funds electronically between an entity's account in a financial institution and the entity's account in the RCMS computer system.

As a result, any individual, company, organization, merchant or financial institution can transfer funds to another individual, company, organization, merchant or financial institution through the RCMS computer system. The RCMS computer system can become a common platform for individuals, businesses and financial institutions to conduct commercial activities.

After a user has opened an account with the computer system of the RCMS, if a fraudster tries to use the user's stolen identity to conduct a financial transaction at a bank, in one aspect of the present disclosure, a teller can enter into the computer system of the RCMS a subset of partial personal identification information used by the RCMS. The computer system of the RCMS can search its database to find and display the photo of the user.

Alternatively, in another aspect of the present disclosure, the teller can scan an official identification document of the fraudster instead of manually entering the subset of partial personal identification information into the computer system of RCMS. The computer system of RCMS can search its database to find and display the photo of the user. The teller can deny the fraudster's transactions if he/she does not correspond to the photo of the user.

In yet another aspect of the present disclosure, the teller can ask a challenge question or request a key code designed by the user. If the person cannot answer the challenge question or give the key code correctly, this person is possibly a fraudster.

In one aspect of the present disclosure, the teller can request the person to provide an additional piece of partial personal information. The computer system of the RCMS compares the additional piece of information of the person with the user's information stored in the RCMS database to determine whether the person is the user.

In yet another aspect of the present disclosure, authorized personnel of a financial institution can call the user's phone number, which was provided by the user and stored in the RCMS database, to verify whether the user is the same person conducting the transactions at the financial institution. In an alternative aspect of the present disclosure, authorized personnel of a financial institution can send an email to the user to verify whether the user has requested the financial institution to conduct a particular transaction.

In one aspect of the present disclosure, the teller can inform the RCMS computer system if the teller rejects the transaction and the RCMS computer system can send an alert information message to the user so that the user is alerted of possible fraud against the user. Similarly, if a fraudster tries to use the user's identity to purchase goods or services at a merchant after stealing the user's identity, in other aspects of the present disclosure, the photo of the user, the challenge questions, the key codes, and/or the additional partial information can be used by the merchant to detect the fraudster.

In another aspect of the present disclosure, the merchant informs the RCMS computer system if the merchant rejects the transaction and the RCMS computer system can send a message to the user so that the user may be alerted that there is a possible fraud against the user.

If a fraudster tries to use the user's identity to purchase goods or services online, in another aspect of the present disclosure, the challenge questions, the key codes and/or the additional partial personal information can be used by the online merchants to detect the fraudster.

In yet another aspect of the present disclosure, if the RCMS computer system rejects the transaction because the answer is wrong, the RCMS computer system can also send a message to the user so that the user is alerted of a possible fraud against the user.

In one aspect of the present disclosure, the RCMS computer system alerts the user's financial institutions after identifying a possible identity theft and/or fraud against the user so that the financial institutions can act to protect the user and the financial institutions.

In another aspect of the present disclosure, a computer system can use the alert provided by the RCMS computer system to implement additional provisions to protect the user, the financial institutions and possibly other clients of the financial institutions. An additional software system can be established in the financial institutions for anti-fraud purposes based on the alert provided by the RCMS computer system.

As a result, the RCMS computer system enables consumers, financial institutions and merchants to jointly detect and prevent fraud in financial transactions.

To further automate the process of financial crime prevention, in one aspect of the present disclosure, the transaction networks of financial institutions, such as the credit card network, debit card network, trading network, insurance network, etc. can be linked to the RCMS computer system so that a user's photo, challenge questions, key codes, and/or additional information can be used by consumers, merchants or financial institutions when they conduct transactions through these transaction networks.

In another aspect of the present invention, the RCMS computer system can be integrated into the existing networks for credit cards, debit cards, stored value cards, ATM cards, gift cards, prepaid cards, etc.

Furthermore, in one aspect of the present disclosure, a password, pass code or fingerprint can be used to protect the personal communication device so that a fraudster who has stolen a user's personal communication device cannot use that personal communication device without the correct password, pass code or fingerprint.

In another aspect of the present disclosure, a password, pass code, personal identification number (PIN), or fingerprint can be used to protect a software application on the personal communication device. For example, a user may be required to enter a correct PIN into the software application on the user's personal communication device to approve a transaction.

In one aspect of the present disclosure, a payer can identify a payee through a mobile app. For example, by using the global position system (GPS) ability of the payer's personal communication device, all possible payees near the payer and their identification information such as name, picture, description, etc. can be displayed on the payer's mobile app based on the location of the payer.

For example, alternatively, by using iBeacon, Bluetooth, Bluetooth Low Energy (BLE) or other local area wireless technology embedded in the payer's personal communication device, all possible payees near the payer and their identification information such as name, picture, description, etc. can be displayed on the payer's mobile app based on the location of the payer.

The payer then selects and/or confirms a payee that is the correct counter party of the transaction. For example, a payer may see three possible payees on the payer's phone. The payer then touches the picture or name of one of the payees on the payer's mobile app to select the touched payee as the counter party of the transaction. Alternatively, the payer may search a list of possible payees and select one of them as the counter party of the transaction. As another option, the payer may enter the name or other identification information of payee into the payer's personal communication device to identify the payee as the counter party of the transaction. For the purposes of clarification, a mobile app is not limited to applications on mobile phones. Any application running on a personal communication device, such as mobile phone, iPhone, Android Phone, Windows Phone, iPad, Smartbook, Mac Book, Windows Tablet, Google Glass, Smart Wearable Devices, etc., is referred to as "mobile app" in the current disclosure.

To facilitate payment transactions for a consumer, in one aspect of the present disclosure, a consumer (e.g., the payer) can give the merchant (i.e., the payee) the payer's RCMS account identification (which consists of AIN and a set of partial personal identification data), the payer's official identification document, or other types of account identification information (e.g., an account number) of payer. The payee can then enter the account identification, the official identification document number, or the other types of account identification information of the payer into the device interface provided by the RCMS computer over the network. Alternatively, payer's account identification information can be transmitted from the personal communication device of the payer through, for example, a bar code, electronic signal, light signal, acoustic signal, magnetic signal, electro-magnetic signal, etc. to payee's personal communication device. The account identification information of the payer received by the payee's personal communication device can be directly sent to the RCMS computer system by the payee's personal communication device.

The above description is presented from the payer's point of view. All the solutions applicable to the payer may also be applied to payee. For example, by using the global position system (GPS) ability or local area wireless communication ability, such as iBeacon, Bluetooth, BLE, etc. of the payee's personal communication device, all possible payers near the payee and their identification information such as name, picture, description, etc. can be displayed on the payee's mobile app based on the location of the payee. The payee then selects and/or confirms a payer that is the correct counter party of the transaction. As another example, the payee may search a list of possible payers and selects one of them as the counter party of the transaction. Similarly, the payee may enter the name or other identification information of the payer into the payee's personal communication device to identify the payer as the counter party of the transaction. A personal communication device is just a special type of device interface provided by the RCMS computer system. In fact, the solutions presented in the current disclosure may be used with any device interface of the RCMS computer system in addition to personal communication device.

Similar to the solution described above, a payee can give a payer the payee's RCMS account identification (which consists of AIN and a set of partial personal identification data), the payee's official identification document, or other types of account identification information (e.g., account number) of payee. The payee's account identification information can be transmitted from the payee's personal communication device through, for example, a bar code, electronic signal, light signal, acoustic signal, magnetic signal, electro-magnetic signal, etc. to the payer's personal communication device. The payer can enter the payee's account identification, the official identification document number, or the other types of account identification information into the device interface, e.g., mobile app, provided by the RCMS computer system over the network. Alternatively, the payee's account identification information received by the payer's personal communication device can be sent to the RCMS computer system by the payer's personal communication device.

In one aspect of the present disclosure, a payer is identified by his personal communication device. In another aspect of the present disclosure, a payee is identified by his personal communication device.

Once the payer and the payee of the transaction have been identified through any one of the above methods, the transaction between payer and payee can be accomplished through a number of different means. For example, a payer can directly approve a transaction through a mobile app on his personal communication device. Similarly, a payee can directly approve a transaction through a mobile app on his personal communication device.

Moreover, the RCMS computer system may assist a merchant to manage its Customer Loyalty Program. For example, in one aspect of the present disclosure, the RCMS computer system sends a message to a consumer, inviting him to join the merchant's Customer Loyalty Program. The consumer can accept the invitation by replying to the message, or by selecting a button in the mobile app. The RCMS computer system will then add the consumer to the Customer Loyalty Program of the merchant.

Once a consumer is linked to a merchant as a member of the merchant's Customer Loyalty Program, the transactions between the consumer and the merchant will be tracked and rewards can be issued according to the merchant's Customer Loyalty Program settings. For example, if a merchant has a customer loyalty program that rewards customers with a five dollar rebate for every one hundred dollars of purchases with the merchant, the RCMS computer system will record and calculate the accumulated transactional amount of each member of the merchant's Customer Loyalty Program for transactions that have occurred between the member and the merchant, and will issue the five dollar rebate to a member for every one hundred dollars spent with the merchant.

In one aspect of the present disclosure, the RCMS computer system helps a merchant conduct special promotions to members of the merchant's Customer Loyalty Program by sending promotions to personal communication devices of the members.

In one aspect of the present disclosure, the RCMS computer system sends a message to a personal communication device of a customer, informing the customer of how much money he/she has spent in the transaction and how much more money he/she needs to spend to earn a particular reward. This message has a promotional effect because the customer is encouraged to spend more money with the merchant.

Traditionally, promotional materials are sent to consumers through the mail. The cost of preparation, printing and mailing is very high. The delay caused by this process can often cause merchants to miss critical market timing. Additionally, most promotional materials are discarded without being read. It is a waste of natural resources and it damages our environment.

Because the RCMS computer system conducts promotions for merchants through personal communication devices, the promotions can be conducted instantly. For example, a restaurant can take a picture of a special dish and mark it with a special price; and the RCMS computer system can instantly send this picture to members of the restaurant's Customer Loyalty Program. There is no printing and mailing involved and there is no delay. There is no waste of natural resources and there is no environmental damage. The entire promotion can be launched instantly and ended within a few hours to fully utilize the perishable inventory and the empty tables in the restaurant.

Furthermore, because the RCMS computer system also conducts payments on behalf of customers, the RCMS can charge a service fee only when the promotion becomes successful. For example, the RCMS can charge 5% of the price as the service fee to promote a special dish for a restaurant. If nobody orders that dish, the restaurant does not pay any service fee to the RCMS. If a customer orders that dish for ten dollars, the RCMS computer system will charge fifty cents as its services fee when the customer pays the restaurant through the RCMS. For example, the RCMS computer system transfers ten dollars out from the customer's account, transfers fifty cents to an account owned by the RCMS, and transfers the balance of $9.50 to an account owned by the restaurant.

As a result of the above arrangement, merchants are more likely to conduct promotions with the RCMS because there is no upfront cost and the service fee is charged based on the result of the promotional campaign. The promotion campaign can be launched instantly to increase the gain of a business opportunity. In one aspect of the present disclosure, a promoted item can be a product, service, material, tangible property, intangible property, or any item that can be offered by any business or non-business operation.

As a result of the present disclosure, merchants have great incentives to use the services provided by the RCMS because the RCMS helps merchants conduct marketing promotions, implement Customer Loyalty Programs, conduct payment transactions, and track customers' activities without the need for the merchants to establish an expensive in-house computer system.

More importantly, consumers have incentives to join the RCMS club because they can save time and money, their privacy is fully protected, and all transactions can be conducted securely without the need for customers to carry any traditional instruments such as cash, credit card, debit card, prepaid card, stored-value card, gift card, check, monetary instrument, coupon, token, ticket, voucher, certificate, note, securities, etc.

In fact, a consumer can easily conduct any payment as long as he/she carries a personal communication device, such as a mobile phone, smartphone, Smartbook, PDA, etc. In the event that a consumer forgets to carry his mobile phone, PDA, etc., he/she can still use the merchant's computer to log into the RCMS to directly transfer funds from the consumer's RCMS account to the merchant's RCMS account.

Additionally, the present disclosure can quickly and securely transfer money from one person to another person. The RCMS becomes a Global Remittance Network.

In summary, many different aspects and combinations of aspects are disclosed. A particular aspect or a particular combination of aspects can be applied based on commercial reasons.

As contemplated in the described aspects, one of many possible combinations is described below as an example. The computer system of the Retail Customer Management System ("RCMS") 500 and a network 600, such as the Internet, mobile network, WiFi, Bluetooth, Bluetooth Low Energy, etc., enable a retail store 400 to manage customers 100, 200 and 300 as shown in FIG. 1.

Figure 2A:
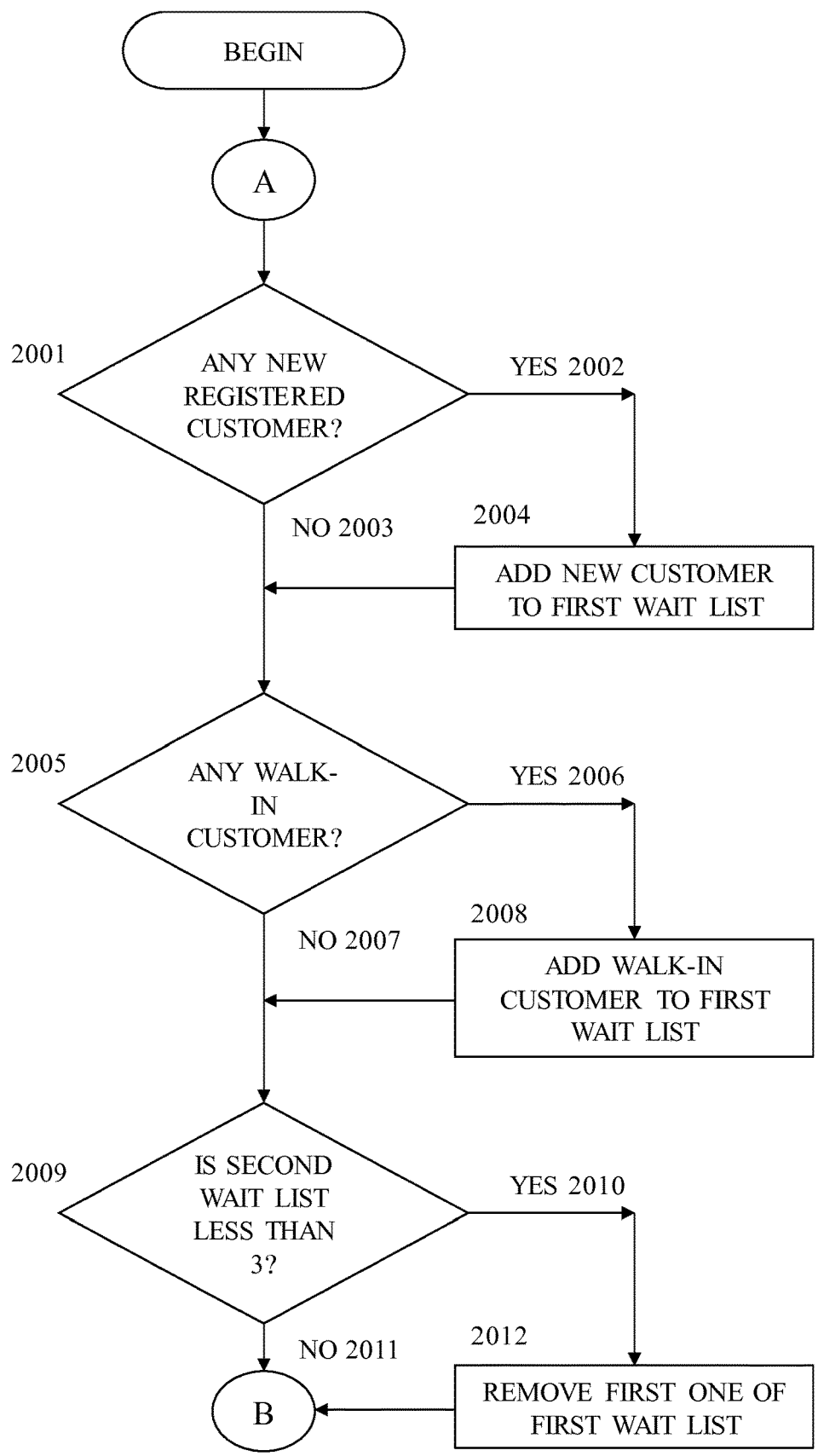
FIGS. 2A to 2C are flowcharts of an example process, indicating how the Retail Customer Management System helps a business manage customers with the computer system of RCMS as shown in FIG. 1, according to an aspect of the present disclosure.
Figure 2B:
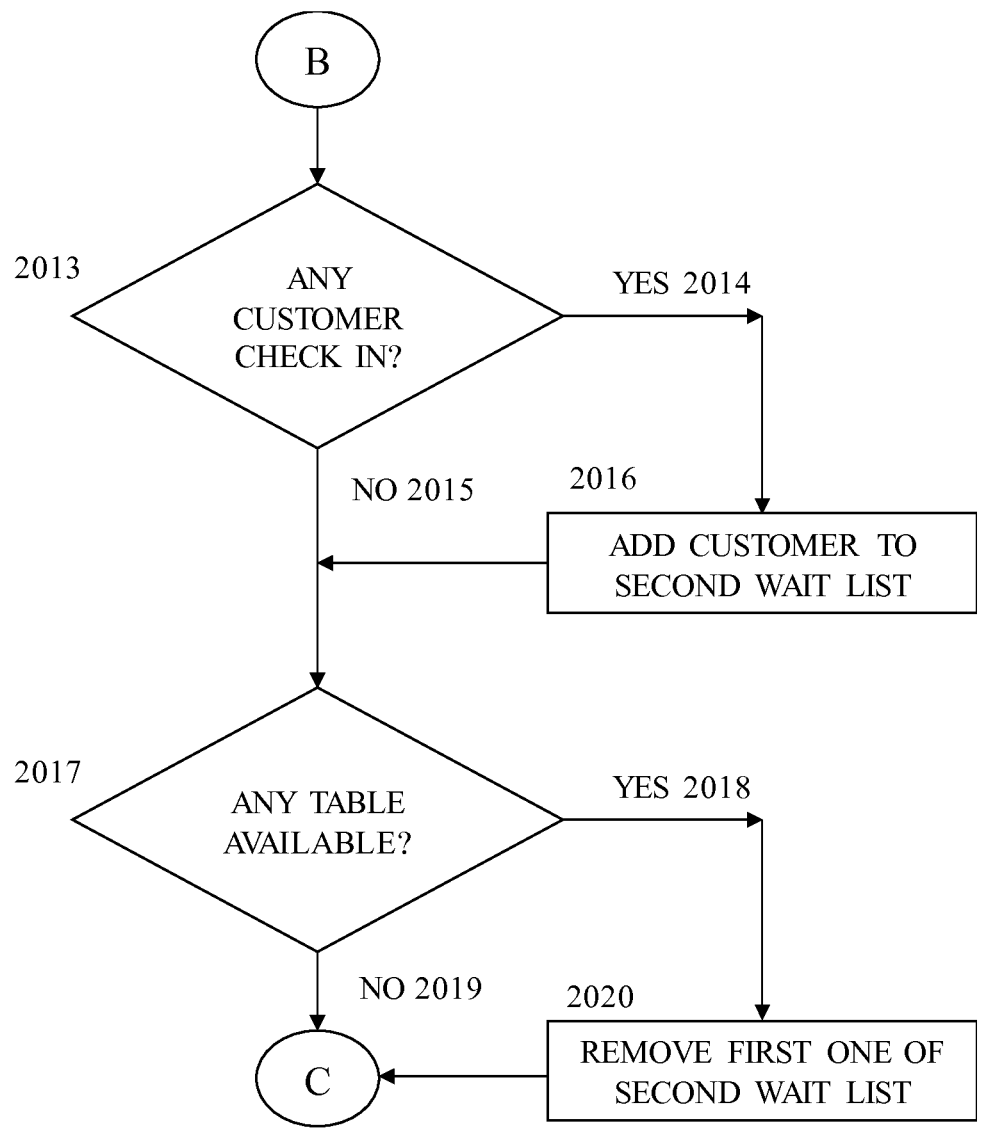
Figure 2C:
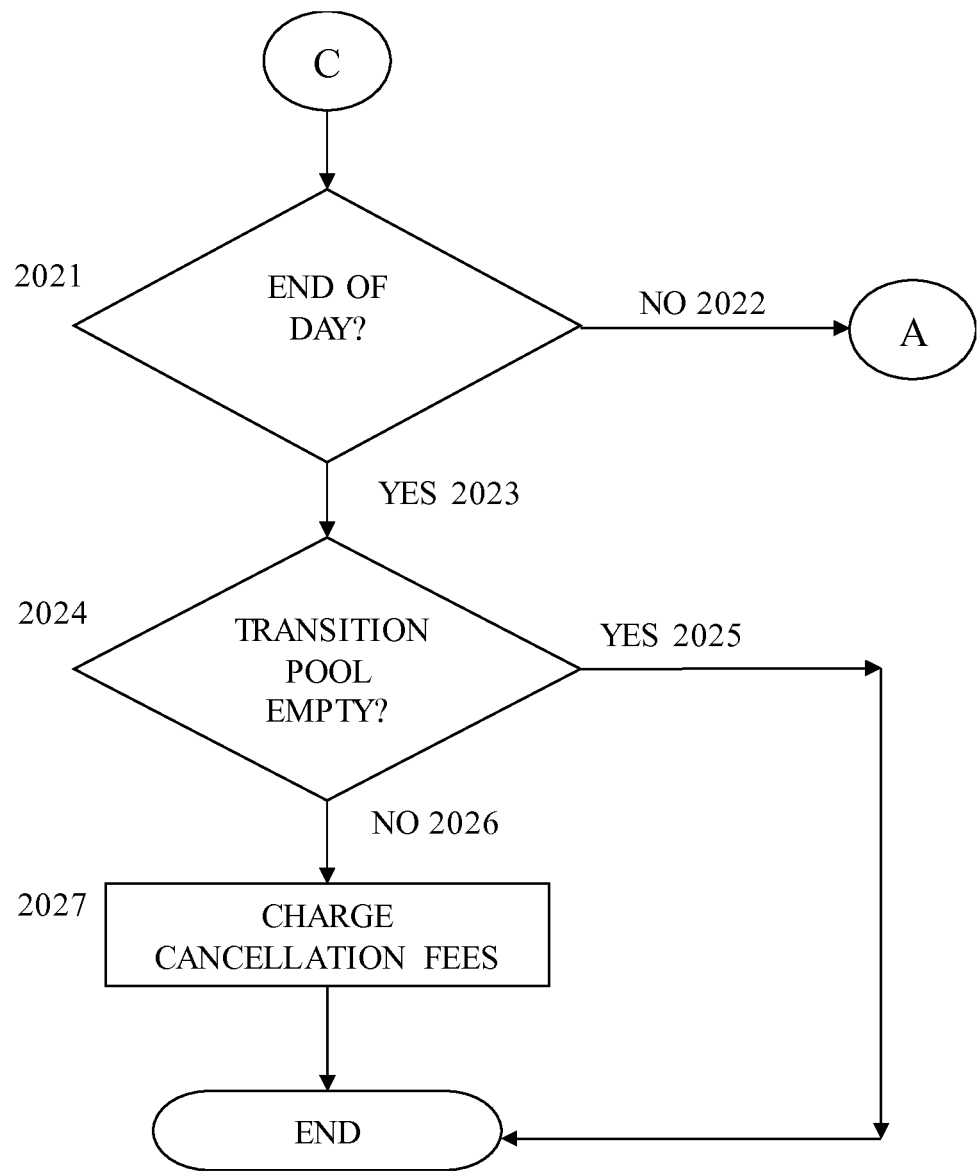

Reference should now be made to the flowchart of FIGS. 2A to 2C in combination with the system diagram of FIG. 1, which together illustrate how a restaurant can manage customers with the computer system of the RCMS 500.

Two wait lists and one transition pool are used in this example to explain how the RCMS computer system 500 works. In general, a party of multiple customers may plan to have dinner together. There is no need to register all customers of the party with the restaurant. Instead, one customer can represent the entire party as long as the information regarding the actual number of customers in the party is given to the restaurant. Therefore, a customer and a party have the same meaning in this example. For example, when a customer is assigned to a wait list, the customer and his entire party are assigned to the wait list as one entity in the wait list.

First, a customer 100, who plans to have dinner in a restaurant, uses the software application on her personal communication device (e.g., iPhone) to remotely log into the RCMS computer system 500 so that she is added to the waiting list of the restaurant. The RCMS computer system 500 checks whether there is any customer who registers for the waiting list (decision block 2001). If the answer is "NO" (NO branch 2003), the RCMS computer system 500 continues to decision block 2005. In this example, because the answer is "YES" (YES branch 2002), the RCMS computer system 500 adds the customer 100 to the last position of a first wait list (block 2004) then continues to decision block 2005.

The first wait list is a first-in-first-out wait list. Conceptually speaking, a new entity is added to the last position (e.g., tail) of the wait list. Each of the entities in the wait list moves up by one position whenever the entity at the first position (e.g., head) of the wait list is removed from the wait list. For example, if there are ten entities in the wait list, the last entity will move up to become the first entity after the entity at the first position has been removed nine times.

Therefore, a first-in-first-out wait list is conceptually similar to a waiting line in front of a ticket office of a movie theater. A new customer joins the line at the last position. All entities in the line move up by one position after the entity at the first position of the line has purchased his ticket and left the line. Eventually, the entity at the last position will move up to the first position.

If the customer 200 walks into the restaurant without registering remotely as the customer 100 did, the hostess of the restaurant 400 can enter the name and phone number of the customer 200 into the RCMS computer system 500. Upon receiving the phone number, the RCMS computer system 500 sends a text message to the walk-in customer 200, confirming that he has been added to the waiting line. In addition, as an option, the message can invite the walk-in customer 200 to become a member of the RCMS club so that he does not need to show up in person to put his name on the restaurant's wait list next time. Because it is quite boring to wait at the restaurant, the walk-in customer 200 is likely to use this time to sign on as a member of the RCMS.

The RCMS computer system 500 checks whether there is any customer who walks into the restaurant (decision block 2005). If the answer is "NO" (NO branch 2007), the RCMS computer system 500 continues to decision block 2009. Because the answer is "YES" (YES branch 2006) in this example, the RCMS computer system 500 adds the walk-in customer 200 to the last position of the first wait list (block 2008), then continues to decision block 2009. The RCMS computer system 500 sends a message to the customer 200, confirming his registration at the restaurant's waiting line and inviting him to join the RCMS club.

During a busy weekend and on a holiday, there may be many customers who want to dine in a popular restaurant. Under such circumstances, it is not uncommon to wait for over one hour before being seated in the restaurant. Therefore, the length of the first wait list can be very long during a busy evening. Traditionally, customers have to show up in a restaurant to sign in so that they can be assigned on a first-come-first-serve basis to a waiting list. Some customers, who cannot wait or do not want to wait, may give up waiting and find another restaurant. Restaurants are losing business because of this frustrating waiting period.

With the RCMS computer system 500, this frustration can be avoided. For example, a customer can register at the restaurant's waiting list at home through her personal communication device and the RCMS computer system 500 informs the customer of the current waiting time, e.g., 75 minutes. The customer can then estimate when she should leave home in order to arrive at the restaurant in time for her table. In addition, as an option, the RCMS computer system 500 may request the customer to get ready to check in at the restaurant when there are, for example, only six parties ahead of the customer in the first wait list. Promotions, such as today's special, can also be sent to the customer through her personal communication device. As a result, the customer does not need to wait in the lobby of the restaurant. Instead, she can use the time she would have spent waiting at the restaurant to take care of other matters and arrive at the restaurant later without hassle or pressure.

To protect the restaurant against any abuse of the registration system, a small fee, e.g., five dollars per person, can be charged to the customer for her remote registration. This fee can be adjusted based on the number of persons in the party. For example, five dollars can be charged for each person in the party. If the customer registers for four persons, a twenty dollar service fee will be charged. If the party dines in the restaurant later, this fee can be refunded to the customer. If the party does not show up that evening, the fee will be forfeited as a "cancellation fee" to cover the wasted resources associated with the irresponsible registration.

In one aspect of the present disclosure, a second first-in-first-out wait list is used to manage those customers who have checked in with the hostess of the restaurant 400 after they had been requested by the RCMS computer system 500 to check in with the restaurant. In reality, it is very difficult to predict when a table of guests will leave after they finished their meals. To fully utilize all the available tables in a restaurant, the restaurant may prefer to have at least three parties of guests waiting in its lobby. In general, customers do not mind waiting in the lobby if there are only about three to four parties ahead of them.

The RCMS computer system 500 checks whether a length of the second wait list is less than three parties (decision block 2009). The number "3" is used as an example. In practice, this number can be determined by the restaurant based on its preference. If the answer is "NO" (NO branch 2011), the RCMS computer system 500 continues to decision block 2013. If the answer is "YES" (YES branch 2010), the RCMS computer system 500 sends a message to the personal communication device of a customer who is at the first position of the first wait list, requesting the customer to check in with the restaurant (block 2012), then continues to decision block 2013. Once the message is sent to the customer at the first position (i.e., head) of the first wait list, this customer is removed from the first wait list and assigned into a transition pool. The transition pool is used to accommodate those entities that have been removed from the first wait list but have not been added to the second wait list. As time goes on, the customer 100 will eventually move up to the first position of the first wait list. She will receive a message from the RCMS computer system 500, which asks her to check in with the restaurant. After receiving the message, the customer 100 is removed from the first wait list and assigned into the transition pool.

Customers may not immediately check in with the hostess of the restaurant 400 after receiving the check-in messages from the RCMS computer system 500. For example, a customer may encounter a traffic jam and her schedule may be delayed. Therefore, it is not practical for the restaurant to allocate a table for a party that is still in the transition pool until the party has checked in with the hostess of the restaurant 400. The transition pool has a smoothing effect that filters out irregularities between the first wait list and the second wait list.

The RCMS computer system 500 determines whether any customer checks in with the hostess of the restaurant 400 (decision block 2013). If the answer is "NO" (NO branch 2015), the RCMS computer system 500 continues to decision block 2017. If the answer is "YES" (YES branch 2014) because the customer 100 has checked in with the hostess of the restaurant 400, the RCMS computer system 500 removes the customer 100 from the transition pool and adds her to the last position of the second wait list (block 2016), then continues to decision block 2017. The second wait list only includes a few parties that have already checked in with the hostess of the restaurant 400.

The hostess of the restaurant 400 will monitor the availability of tables in the restaurant. If there is a table available, the hostess of the restaurant 400 informs the RCMS computer system 500 of such availability. The RCMS computer system 500 checks whether any table is available (decision block 2017). If the answer is "NO" (NO branch 2019), the RCMS computer system 500 continues to decision block 2021. If the answer is "YES" (YES branch 2018), the RCMS computer system 500 removes the first party from the second wait list (while the hostess of the restaurant 400 leads the removed first party to the available table), then continues to decision block 2021. Given time, both the customer 100 and customer 200 will be moved to the first position of the second wait list, respectively, and they will be led to their respective tables.

Assuming the customer 300 has remotely registered with the RCMS computer system 500 but has never checked in with the hostess of the restaurant 400 after the RCMS computer system 500 sent a check-in message to him, the customer 300 will be left in the transition pool at the end of the day. At the end of business day, the hostess of the restaurant 400 informs the RCMS computer system 500 that the restaurant has been closed. The RCMS computer system 500 checks whether it is the end of the business day (decision block 2021). If the answer is "NO" (NO branch 2022), the RCMS computer system 500 continues to decision block 2001 to restart its service process again. If the answer is "YES" (YES branch 2023), the RCMS computer system 500 continues to decision block 2024.

The RCMS computer system 500 checks whether the transition pool is empty (decision block 2024). If the answer is "NO" (NO branch 2026), the RCMS computer system 500 charges the entities left in the transition pool cancellation fees (e.g., $5 per person), then ends the process. If the answer is "YES" (YES branch 2025), the RCMS computer system 500 ends the process.

The above process is handled by the RCMS computer system 500. The hostess of the restaurant 400 only works with a few parties at any given time after the RCMS computer system 500 asks them to check in with the restaurant. It is an easy job for the hostess of the restaurant. At the same time, customers are much happier because nobody waits for a long time in the lobby of the restaurant. There is no rush or hassle when dining out. Restaurants will make more money because fewer people will walk away from the restaurant due to waiting in the restaurants.

In practice, a restaurant may have tables of different sizes to fit parties of different sizes. Sometimes, a restaurant may combine multiple smaller tables to fit a large party. Therefore, a restaurant may assign each party to one of a multiple groups with each group having its own first wait list and second wait list. For example, a restaurant may decide that a party of four persons or less belongs to Group A; a party of five to eight persons belongs to Group B; and a party of more than eight persons belongs to Group C. As a result, when a party of three persons conducts remote registration, this party will be assigned to the first wait list of Group A. Eventually, this party will be moved to the second wait list of Group A. Similarly, when a party of seven persons conducts remote registration, this party will be assigned to the first wait list of Group B and will eventually be moved to the second wait list of Group B. When a party of twelve persons conducts remote registration, this party will be assigned to the first wait list of Group C and will eventually be moved to the second wait list of Group C. Therefore, when a customer remotely registers with a restaurant on behalf of his party, this customer will be assigned to one of the first wait lists of the restaurant based on the size of his party.

Once a restaurant has decided how to define its Groups—each with a first wait list and a second wait list—for different sizes of parties, the above process can be automated by a computer system. Because a party of a larger size may spend a longer time in the restaurant, the predefined Reference Length of the second wait list of each Group for the computer system to request the next party of the first wait list to check in may be different for Groups A, B or C. For example, for Group A, the computer system may request the next party of the first wait list to check in when the second wait list is less than six parties. In comparison, for Group C, the computer system may request the next party of the first wait list to check in when the second wait list is less than two parties.

Furthermore, because a larger table can accommodate a small party and multiple smaller tables can be combined together to accommodate a larger party, the restaurant can always manually override the decision by the computer and request the next party of the first wait list of any group to check in based on the actual situation in the restaurant. Because only a few groups are involved, this kind of decision for manual override can be easily made by the host of the restaurant.

Because it takes some time for a party to check in with a restaurant after receiving the message to check in, there is a need for a time gap between each new check-in message. In one aspect of the present disclosure, the time gap between each message to request the next party of the first wait list to check in is determined by the restaurant. For example, if a restaurant decides that the time gap should be three minutes and the Reference Length of the second wait list is four parties, the computer system sends a message to the first party of the first wait list when the second wait list is less than four parties and removes the first party from the first wait list. If the removed first party does not check in within three minutes, i.e., the time gap, the computer system will ask the next party on the first wait list to check in. This process will continue every three minutes until the second wait list has at least four parties.

If the time gap is too short, there will be too many parties checking in at the same time and the second wait list may become too long. If the time gap is too long, there may be an empty table unutilized because the next party has not checked in yet. Many factors may affect the theoretical size of the time gap. In practice, a proper time gap can be set based on a trial and error process conducted by the restaurant. Because there may be unusual situations, in one aspect of the present disclosure, the computer system permits the restaurant to override the regular computer process by speeding up or slowing down the process of requesting the next party of the first wait list to check in.

In addition, the RCMS computer system 500 can help restaurants manage their promotions and loyalty programs. With real-time promotions and incentives offered by the loyalty program, the RCMS computer system 500 can help restaurants fill up their empty tables during the weekdays. The profitability of a restaurant will be boosted by the RCMS computer system 500. In one aspect of the present disclosure, to reduce the marketing cost to retail businesses, the RCMS computer system 500 charges its service fees after the deals are completed.

For example, when the customer 100 finishes her dinner, the RCMS computer system 500 sends her an electronic bill through a mobile app on her personal communication device. The bill lists all items ordered and the prices, special promotional items ordered and prices, total amount of discount received, tax amount, and total amount due. The customer 100 adds a tip and approves the RCMS computer system 500 to make a payment to the restaurant through her mobile app.

The RCMS computer system 500 transfers the total amount approved by the customer 100 from an account of the customer 100. The RCMS computer system 500 transfers a fee charged by the RCMS to an account owned by the RCMS. The RCMS computer system 500 transfers the balance, i.e., total amount minus fee, to an account owned by the restaurant.

As a result, many aspects of the present disclosure effectively help retail businesses manage customers, promote businesses, reduce cost, and achieve great success.

The methodologies described herein may be implemented by various means depending upon the application. For example, these methodologies may be implemented in hardware, firmware, software, or any combination thereof. For a hardware implementation, the processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM, DVD, or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blue-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. The communication apparatus may not store all of the instructions and/or data on a computer readable medium.

The aspects described in this disclosure can be assembled to form a variety of applications based on the need. Those skilled in the art and technology to which this disclosure pertains can appreciate that alterations and changes in the described structure may be practiced without meaningfully departing from the principal, spirit and scope of this disclosure. Such alterations and changes should not be construed as deviations from the present disclosure.

What is claimed is:

1. A computer system to manage customers for a store, comprising:
a memory device; and
at least one processor coupled to the memory device, the at least one processor executing program code stored in a non-transitory computer readable medium, the executed program code configuring the at least one processor:
to receive, from a personal communication device of a customer, a customer record and an indication that the customer record is assigned to a tail of a first wait list queue of the store when a geolocation of the personal communication device of the customer is at a location remote from a geolocation of the store;
to generate first account identification information from stored account information of the customer in response to receiving the customer record, the at least one processor extracting portions of customer identification information to construct an account identification number included in the first account identification information;
to monitor the first wait list queue and a second wait list queue;
to determine a length of the second wait list queue is shorter than a predetermined length in response to monitoring the second wait list queue;
to determine the customer record is at a head of the first wait list queue in response to monitoring the first wait list queue and the second wait list queue;
to assign the customer record to a transition pool list queue of the store in response to determining the length of the second wait list queue is shorter than the predetermined length and the customer record is at the head of the first wait list queue;
to generate an arrival request message requesting the customer to arrive at the store in response to assigning the customer record to the transition pool list queue;
to transmit the arrival request message to the personal communication device;
to monitor, by the at least one processor, a geolocation of the personal communication device of the customer;
to generate a list of payees within a predefined distance of a current geolocation of the personal communication device of the customer in response to a request from the personal communication device of the customer, the current geolocation identified based on the monitored geolocation;
to transmit the list of payees to the personal communication device of the customer;
to identify the store as a party to a transaction with the customer based on feedback received from the personal communication device of the customer in response to transmitting the list of payees;
to determine the customer has physically arrived at the store in response to receiving an arrival input at a communication device of the store;
to move the customer record from the transition pool list queue to a tail of the second wait list queue of the store in response to determining the physical arrival at the store;
to receive, from the communication device of the store, a transaction message indicating that the customer is a counterparty to the transaction, the transaction message comprising second account identification information received from the customer;

to determine the first account identification information matches the second account identification information, the at least one processor matching at least a portion of the second account identification to the generated account identification number included in the first account identification information;

to remove the customer record from the second wait list queue when the store acts in response to the customer record being at the head of the second wait list queue; and to approve the transaction between the customer and the store in response to determining the first account identification information matches the second account identification information and identifying the store as the party to the transaction.

2. The computer system of claim 1 in which the personal communication device of the customer comprises a device interface.

3. The computer system of claim 2 in which the device interface comprises a keyboard, keypad, monitor, display, terminal, computer, mobile phone, smartphone, tablet, Personal Digital Assistant (PDA), smart watch, smart wearable devices, control panel, vehicle dash board, network interface, machinery interface, video interface, audio interface, electrical interface, electronic interface, magnetic interface, electromagnetic interface including electromagnetic wave interface, optical interface, light interface, acoustic interface, video interface, audio interface, contactless interface, handheld device interface, portable device interface, wireless interface, wired interface, or other type of interface.

4. The computer system of claim 1 in which the store comprises a restaurant, fast food store, food stand, food truck, bookstore, clothing store, grocery store, drug store, gift store, shoe store, bag store, furniture store, convenience store, electronic store, appliance store, equipment store, tool store, department store, gardening store, building material store, supermarket, bus stop, bus station, train stop, train station, taxi stand, car shop, boat shop, vehicle shop, hotel, apartment, financial institution, money services provider, school, theater, park, fair ground, entertainment center, hospital, medical center, dentist office, doctor office, beauty salon, barbershop, goods provider, service provider, organization, club, association, company, office, business, kiosk, machine, or any type of facility which interfaces with customers.

5. The computer system of claim 1 in which the executed program code is further configured to perform an action on the customer record in the transition pool list queue.

6. The computer system of claim 5 in which the action is sending a message to the customer in the transition pool list queue.

7. The computer system of claim 5 in which the action is providing driving directions to the customer in the transition pool list queue.

8. The computer system of claim 5 in which the action is conducting the transaction associated with the customer in the transition pool list queue.

9. The computer system of claim 5 in which the action is providing an incentive to the customer in the transition pool list queue.

10. The computer system of claim 5 in which the action is issuing a penalty to the customer in the transition pool list queue.

11. The computer system of claim 1, in which the customer record comprises at least one of a name, a picture, identification information, or a combination thereof.

12. A computerized method to manage customers for a store, comprising:

receiving, at a computer system comprising at least one processor from a personal communication device of a customer, a customer record and an indication that the customer record is assigned to a tail of a first wait list queue of the store when a geolocation of the customer is at a location remote from a geolocation of the store;

generating, by the at least one processor, first account identification information from stored account information of the customer in response to receiving the customer record, the at least one processor extracting portions of customer identification information to construct an account identification number included in the first account identification information;

monitoring the first wait list queue and a second wait list queue;

determining a length of the second wait list queue is shorter than a predetermined length in response to monitoring the second wait list queue;

determining the customer record is at a head of the first wait list queue in response to monitoring the first wait list queue and the second wait list queue;

assigning, by the computer system, the customer record to a transition pool list queue of the store in response to determining the length of the second wait list queue is shorter than the predetermined length and the customer record is at the head of the first wait list queue;

generating an arrival request message requesting the customer to arrive at the store in response to assigning the customer record to the transition pool list queue;

transmitting the arrival request message to the personal communication device;

monitoring, by the at least one processor, a geolocation of the personal communication device of the customer;

generating a list of payees within a predefined distance of a current geolocation of the personal communication device of the customer in response to a request from the personal communication device of the customer, the current geolocation identified based on the monitored geolocation;

transmitting the list of payees to the personal communication device of the customer;

identifying the store as a party to a transaction with the customer based on feedback received from the personal communication device of the customer in response to transmitting the list of payees;

determining the customer has physically arrived at the store in response to receiving an arrival input;

moving, by the computer system, the customer record from the transition pool list queue to a tail of the second wait list queue of the store in response to determining the physical arrival at the store;

receiving, from the communication device of the store, a transaction message indicating that the customer is a counterparty to the transaction, the transaction message comprising second account identification information received from the customer;

determining the first account identification information matches the second account identification information, the at least one processor matching at least a portion of the second account identification to the generated account identification number included in the first account identification information;

removing, by the computer system, the customer record from the second wait list queue when the store acts in response to the customer record being at the head of the second wait list queue; and approving the transaction between the customer and the store in response to determining the first account identification information matches the second account identification information and identifying the store as the party to the transaction.

13. The computerized method of claim 12 in which the personal communication device of the customer comprises a device interface.

14. The computerized method of claim 13 in which the device interface comprises a keyboard, keypad, monitor, display, terminal, computer, mobile phone, smartphone, tablet, Personal Digital Assistant (PDA), smart watch, smart wearable devices, control panel, vehicle dash board, network interface, machinery interface, video interface, audio interface, electrical interface, electronic interface, magnetic interface, electromagnetic interface including electromagnetic wave interface, optical interface, light interface, acoustic interface, video interface, audio interface, contactless interface, handheld device interface, portable device interface, wireless interface, wired interface, or other type of interface.

15. The computerized method of claim 12 in which the store comprises a restaurant, fast food store, food stand, food truck, bookstore, clothing store, grocery store, drug store, gift store, shoe store, bag store, furniture store, convenience store, electronic store, appliance store, equipment store, tool store, department store, gardening store, building material store, supermarket, bus stop, bus station, train stop, train station, taxi stand, car shop, boat shop, vehicle shop, hotel, apartment, financial institution, money services provider, school, theater, park, fair ground, entertainment center, hospital, medical center, dentist office, doctor office, beauty salon, barbershop, goods provider, service provider, organization, club, association, company, office, business, kiosk, machine, or any type of facility which interfaces with customers.

16. The computerized method of claim 12 in which the transaction is associated with a product, a service, a material, a process, a tangible property, an intangible property, or other thing that can be traded.

17. The computerized method of claim 12, in which the customer record comprises at least one of a name, a picture, identification information, or a combination thereof.

* * * * *